(12) United States Patent
Merchant et al.

(10) Patent No.: US 7,062,357 B2
(45) Date of Patent: Jun. 13, 2006

(54) MULTIPLE REGION CONVOLVER WITH TAPERING

(75) Inventors: Michael Merchant, Apple Valley, MN (US); Richard Lund, Chaska, MN (US); Doug Mann, Shorewood, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 550 days.

(21) Appl. No.: 09/960,626

(22) Filed: Sep. 21, 2001

(65) Prior Publication Data

US 2002/0072811 A1    Jun. 13, 2002

Related U.S. Application Data

(60) Provisional application No. 60/234,131, filed on Sep. 21, 2000.

(51) Int. Cl.
  *G05D 23/00*    (2006.01)
(52) U.S. Cl. .......... 700/280; 700/275; 700/29; 700/30; 700/31; 703/7; 703/8; 702/56
(58) Field of Classification Search ........... 700/29–31, 700/275, 280, 278; 703/7–8; 702/56
See application file for complete search history.

(56) References Cited

U.S. PATENT DOCUMENTS

| | | | | |
|---|---|---|---|---|
| 2,916,709 A | 12/1959 | Putzrath | ..................... | 333/139 |
| 3,739,374 A | 6/1973 | Kiowski | ..................... | 341/147 |
| 3,855,841 A | 12/1974 | Hunter | ..................... | 73/11 |
| 4,061,017 A | 12/1977 | Sloane et al. | ................ | 73/579 |
| 4,480,480 A | 11/1984 | Scott et al. | ................... | 73/769 |
| 4,513,622 A | 4/1985 | Uretsky | ....................... | 73/664 |
| 4,537,076 A | 8/1985 | Lax et al. | ..................... | 73/662 |
| 4,916,632 A | 4/1990 | Doi et al. | ................... | 364/508 |
| 4,989,158 A | 1/1991 | Sloane | ....................... | 364/508 |
| 5,175,678 A | 12/1992 | Frerichs et al. | ............. | 364/148 |
| 5,209,661 A | 5/1993 | Hildreth et al. | .............. | 434/45 |
| 5,317,104 A | 5/1994 | Frost | ........................ | 84/660 X |
| 5,339,016 A | 8/1994 | Thoen | ........................ | 318/610 |
| 5,353,207 A | 10/1994 | Keeler et al. | ............... | 364/164 |
| 5,377,307 A | 12/1994 | Hoskins et al. | .............. | 395/22 |
| 5,561,667 A | 10/1996 | Gerlach | ...................... | 370/286 |
| 5,568,404 A | 10/1996 | Strumolo | .................... | 364/558 |
| 5,572,440 A | 11/1996 | Harashima et al. | ......... | 364/508 |
| 5,598,329 A | 1/1997 | Niemann | .................... | 364/150 |
| 5,623,402 A | 4/1997 | Johnson | ..................... | 364/162 |
| 5,633,795 A * | 5/1997 | Popovich | .................... | 700/28 |
| 5,649,063 A | 7/1997 | Bose | .......................... | 395/22 |

(Continued)

FOREIGN PATENT DOCUMENTS

DE    22 41 810 A    3/1973

(Continued)

OTHER PUBLICATIONS

MTS Software Manual Set, "RPC® III on a Windows NT Platform", Version 4.2D, vol. 3, pp. D-64-D-77, Mar. 1998.

(Continued)

*Primary Examiner*—Anthony Knight
*Assistant Examiner*—Ronald D Hartman, Jr.
(74) *Attorney, Agent, or Firm*—Todd R. Fronek; Westman, Champlin & Kelly

(57) ABSTRACT

A multiple region convolver includes tapering between successive models of a physical system. The tapering is performed during a transition period.

27 Claims, 15 Drawing Sheets

U.S. PATENT DOCUMENTS

| | | | |
|---|---|---|---|
| 5,659,667 A | 8/1997 | Buescher et al. | 395/23 |
| 5,729,463 A | 3/1998 | Koenig et al. | 364/468.04 |
| 5,732,373 A | 3/1998 | Endo | 701/42 |
| 5,777,872 A | 7/1998 | He | 364/149 |
| 5,796,849 A | 8/1998 | Coleman et al. | 381/1.8 |
| 5,901,072 A | 5/1999 | Shimmell | 364/578 |
| 5,949,989 A | 9/1999 | Falkowski et al. | 395/500.29 |
| 6,041,172 A * | 3/2000 | Shah et al. | 703/6 |
| 6,285,972 B1 * | 9/2001 | Barber | 703/8 |
| 6,336,084 B1 * | 1/2002 | Omara et al. | 703/8 |

FOREIGN PATENT DOCUMENTS

| | | |
|---|---|---|
| EP | 0 455 438 A | 11/1991 |
| WO | WO 85/03547 | 8/1985 |
| WO | WO 97/42553 | 11/1997 |
| WO | WO 99/38054 | 7/1999 |

OTHER PUBLICATIONS

B.W. Cryer et al., "A Road Simulation System for Heavy Duty Vehicles", Society of Automotive Engineers, Automotive Engineering Congress and Exposition, Detroit, Michigan, Feb. 23-27, 1976, pp. 1-13.

Richard A. Lund, "Multiple Channel Environmental Simulation Techniques" MTS Systems Corporation, Oct. 1-2, 1979, pp. 1-20.

J.B. Craig, "ITFC—How it works and where to use it", Carl Schenck AG, Sep. 1979, pp. 1-61.

U.S. Appl. No. 10/057,294, filed Nov. 8, 2001, Richard Lund.

Rao, Guthikonda V., Complex Digital Control Systems: Van Nostrand Company, 1979, pp. 52-52.

Jürgen Petersen et al., SAE Technical Paper Series—The Conception, Description, and Application of a New Vehicle Endurance Test System at AUDI NS, International Congress and Exposition, Detroit, Michigan Feb. 22-26, 1982, pp. 1-13.

Richard A. Lund, "Advances In Multiple-Channel Environmental Simulation Techniques", Seminar on Modernization in Automotive Technology, Automotive Research Association of India, Pune, India, Dec. 16-17, 1983.

"RPC-II, Section FDB—Frequency Domain Baseline", MTS Systems Corporation, 1987.

"RPC-11 Software, Spectral Density Iteration", for MTS Systems Corporation, 1987.

"RPC-II Software, Section RPC—Introduction to RPC-II" MTS Systems Corporation, 1987.

Phil Grote and Glen Grenier, "Taking the Test Track to the Lab" Automotive Engineers, Jun. 1987, vol. 95, No. 6, pp. 61-64.

Ian Cook, "Appendix A—User Presentations: How to Get a Drive File—Jaguar Cars", RPC User Group, 8th RPC User Group Meeting, Nov. 9-10, 1988, Eindhoven, the Netherlands, pp. 1-51.

"RPC-II Software, Section FRF—Frequency Response Function" MTS Systems Corporation, 1988.

"RPC-11 Software, Section THI—Time History Iteration" MTS Systems Corporation, 1988.

Iain G. McGregor, "Use of the Iterative De-Convolution Method for Vehicle Stimulations", Automotive technology and automation: 20th International Symposium, May 1989, Florence, Italy, pp. 889-905.

Lee, H. et al., "Nonlinear System Identification Using Recurrent networks, Neural Networks", IEEE International Joint Conference on, Nov. 1991, pp. 2410-2415, vol. 3.

Kimota et al., "Inverse Modeling of Dynamical System-Network Architecture with Identification Network and Adaptation Network", Neural Networks, IEEE International Joint Conferences on, Nov. 1991.

MTS Brochure: "Explaining the Six Steps of Remote Parameter Control™", MTS Systems Corporation, May 1996, pp. 1-11.

"Adaptive Inverse control (AIC) and Online Iteration (OLI)", MTS Systems Corporation, 1997.

"RPC-III Simulation Testing, Analysis, and Control System", for MTS Systems Corporation, 1997.

Witkosski et al., "System Identification Using Selforganizing Feature Maps", Artificial Neural Networks, Fifth International Conference on, vol. 2, Oct. 1997, pp. 100-101.

Chon et al., "Linear and Nonlinear System Identification of Autonomic Heart-rate Modulation", IEEE Engineering in Medicine and Biology Magazine, vol. 16, Issue 5, Sep.-Oct. 1997.

Sasaki et al., "Identification and Control of a Non-minimum Phase Flexible Dynamical System Using Neural Networks, Systems, Man and Cybernetics", 1998 IEEE International Conference on, vol. 2, Oct. 1998.

Wolpert et al., "Multiple Paired Forward and Inverse Models for Motor Control," Neural Networks, vol. 11, No. 7/08, Oct. 1998, pp. 1317-1329.

* cited by examiner

MULTIPLE REGION CONVOLVER WITH TAPERING

CROSS-REFERENCE TO RELATED APPLICATION

This application claims the benefit of U.S. Provisional Patent Application 60/234,131 filed Sep. 21, 2000, the content of which is incorporated herein by reference in its entirety.

BACKGROUND OF THE INVENTION

The present invention relates to a control of a system, machine or process that is repetitive in nature or is amenable to at least some degree of rehearsal. More particularly, the present invention relates to generating drive signals as input to a vibration system.

Vibration systems that are capable of simulating loads and/or motions applied to test specimens are generally known. Vibration systems are widely used for performance evaluation, durability tests, and various other purposes as they are highly effective in the development of products. For instance, it is quite common in the development of automobiles, motorcycles, or the like, to subject the vehicle or a substructure thereof to a laboratory environment that simulates operating conditions such as a road or test track. Physical simulation in the laboratory involves a well-known method of data acquisition and analysis in order to develop drive signals that can be applied to the vibration system to reproduce the operating environment. This method includes instrumenting the vehicle with transducers "remote" to the physical inputs of the operating environment. Common remote transducers include, but are not limited to, strain gauges, accelerometers, and displacement sensors, which implicitly define the operating environment of interest. The vehicle is then driven in the same operating environment, while remote transducer responses (internal loads and/or motions) are recorded as a record. During simulation with the vehicle mounted to the vibration system, actuators of the vibration system are driven so as to reproduce the recorded remote transducer responses (i.e. the record) on the vehicle in the laboratory.

However, before simulated testing can occur, the relationship between the input drive signals to the vibration system and the responses of the remote transducers must be characterized in the laboratory. Typically, this "system identification" procedure involves obtaining a respective model or transfer function of the complete physical system (e.g. vibration system, test specimen, and remote transducers) hereinafter referred to as the "physical system"; calculating an inverse model or transfer function of the same; and using the inverse model or transfer function to iteratively obtain suitable drive signals for the vibration system to obtain substantially the same response from the remote transducers on the test specimen in the laboratory situation as was found in the operating environment. (As those skilled in the art would appreciate, this process of obtaining suitable drive signals is not altered when the remote transducers are not physically remote from the test system inputs, for example, the case where "remote" transducers are the feedback variables, such as force or motion, of the vibration system controller.)

The inverse model is then used during simulation to obtain drive signals for control of the vibration system. However, depending on the desired simulation, it may be better to obtain and use a multiple region inverse model rather than a single inverse model. For example, under time history control, different inverse models would be used for different regions of a desired time history input. Typically, this involves using different inverse models in the control algorithm for different regions of the time history. However, implementing different inverse models successively in the control algorithm can cause instabilities and other unintended effects, which can cause damage to the vibration system or test specimen. Accordingly, improvements are needed to address these problems.

SUMMARY OF THE INVENTION

A method and apparatus for controlling a physical system using a form of a model of the physical system includes applying an input to a first model and a second model of the physical system during a transition period from operating under a first model to operating under a second model. The input is tapered during the transition period when applied to the first model and the second model. Outputs from the first model and the second model are combined during the transition period to control the physical system. A computer readable medium for the same can also be provided.

DETAILED DESCRIPTION OF THE ILLUSTRATIVE EMBODIMENTS

Figure 1:
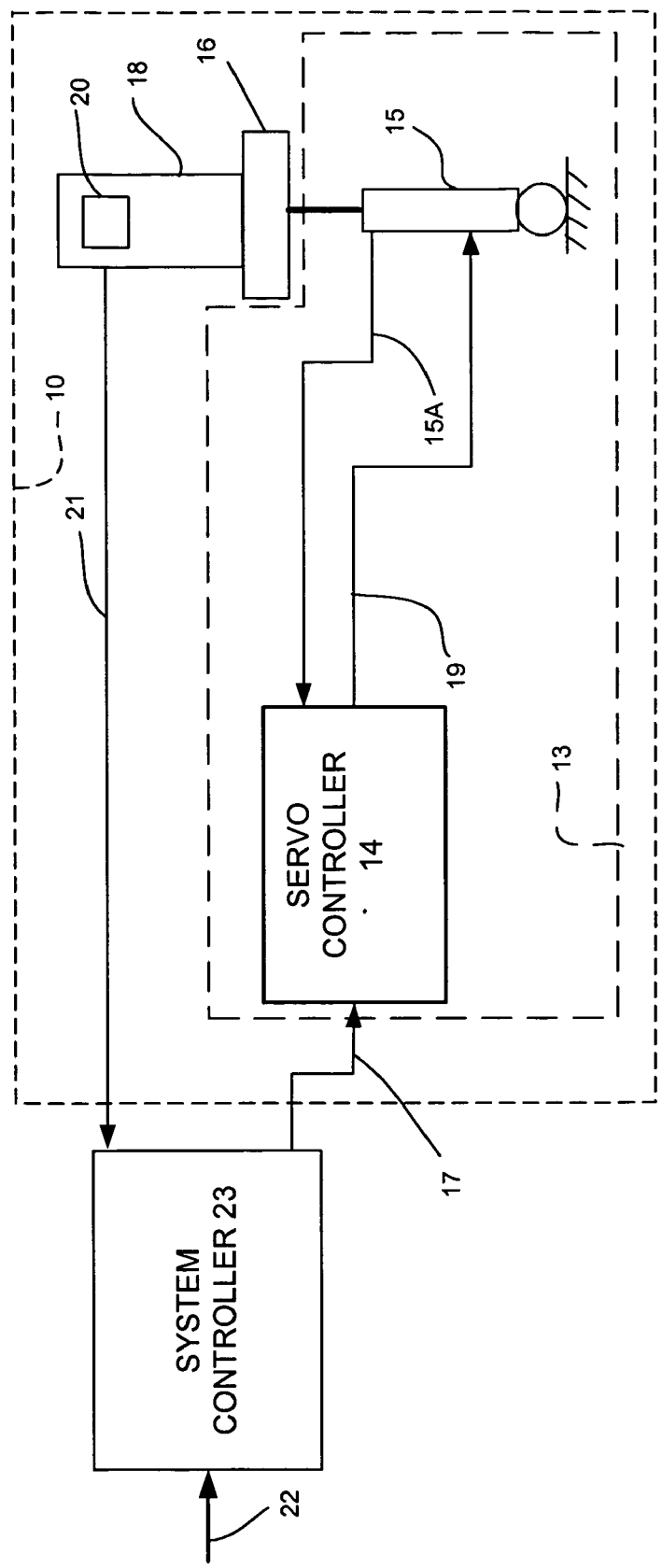
FIG. 1 is a block diagram of an exemplary environment for practicing the present invention.

FIG. 1 illustrates a physical system 10. The physical system 10 generally includes a vibration system 13 comprising a servo controller 14 and an actuator 15. In the schematic illustration of FIG. 1, the actuator 15 represents one or more actuators that are coupled through a suitable mechanical interface 16 to a test specimen 18. The servo controller 14 provides an actuator command signal 19 to the actuator 15, which in turn, excites the test specimen 18. Suitable feedback 15A is provided from the actuator 15 to the servo controller 14. One or more remote transducers 20 on the test specimen 18, such as displacement sensors, strain gauges, accelerometers, or the like, provide a measured or actual response 21. A physical system controller 23 receives the actual response 21 as feedback to compute a drive 17 as input to the physical system 10. In an iterative process discussed below, the physical system controller 23 generates the drive 17 for the physical system 10 based on the comparison of a desired response provided at 22 and the actual response 21 of the remote transducer 20 on the test specimen 18. Although illustrated in FIG. 1 for the single channel case, multiple channel embodiments with response 21 comprising N response components and the drive 17 comprising M drive components are typical and considered another embodiment of the present invention.

Figure 2:
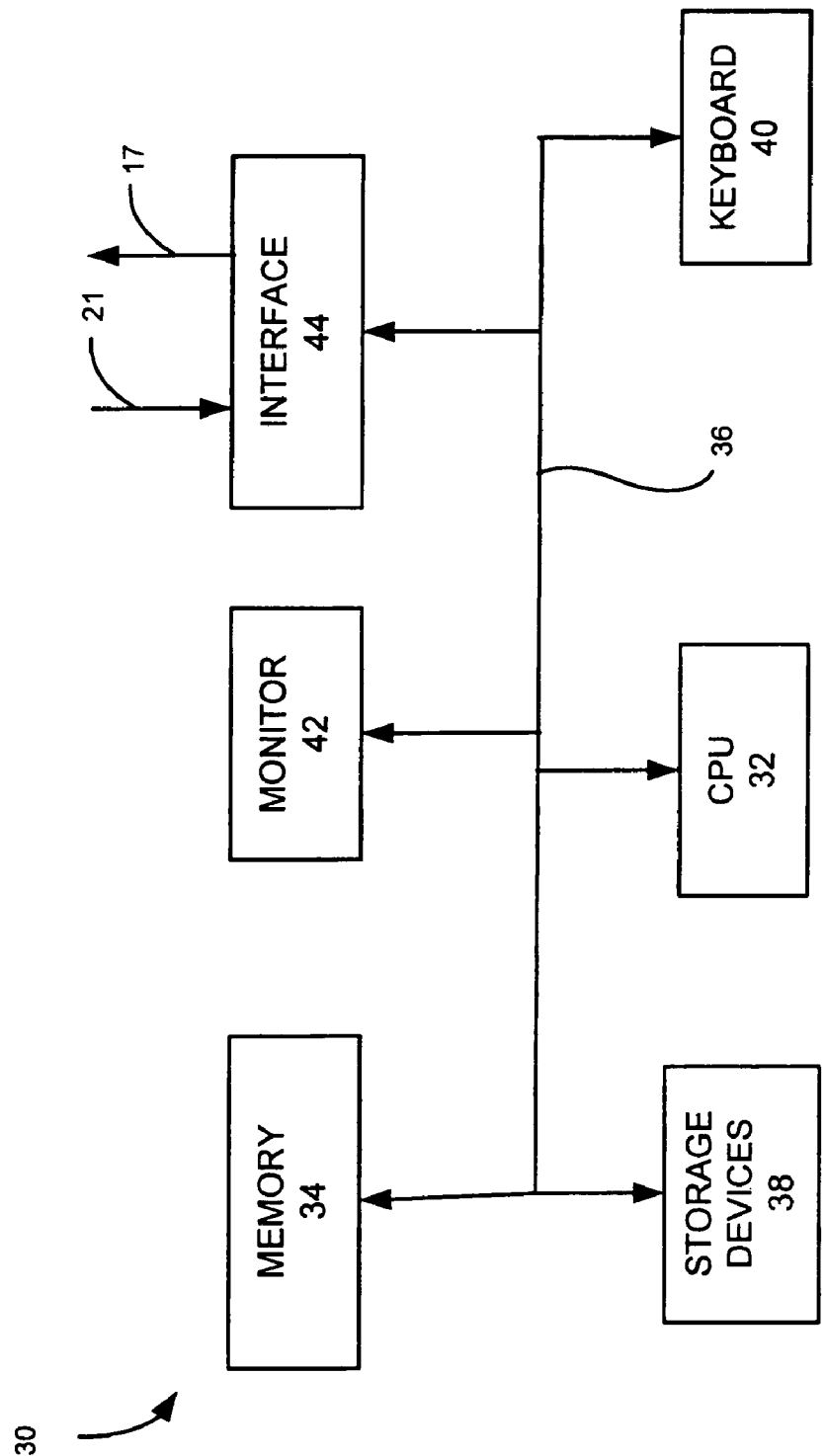
FIG. 2 is a computer for implementing the present invention.

Although described herein where the physical system comprises the vibration system 13 and remote transducer 20, aspects of the present invention described below can be applied to other physical systems. For instance, in a manufacturing process, the physical system includes the manufacturing machines (e.g. presses, molding apparatus, forming machines, etc.) and the drive 17 provides command signals to said machines, and the actual response 21 comprises manual or automatic measured parameters of the manufactured article such as a critical dimension. Another example includes an oil refinery where the physical system is the process plant and the actual response 21 comprises intermediate or final parameters related to output products. FIG. 2 and the related discussion provide a brief, general description of a suitable computing environment in which the invention may be implemented. Although not required, the physical system controller 23 will be described, at least in part, in the general context of computer-executable instructions, such as program modules, being executed by a computer 30. Generally, program modules include routine programs, objects, components, data structures, etc., which perform particular tasks or implement particular abstract data types. The program modules are illustrated below using block diagrams and flowcharts. Those skilled in the art can implement the block diagrams and flowcharts to computer-executable instructions. Moreover, those skilled in the art will appreciate that the invention may be practiced with other computer system configurations, including multi-processor systems, networked personal computers, mini computers, main frame computers, and the like. The invention may also be practiced in distributed computing environments where tasks are performed by remote processing devices that are linked through a communications network. In a distributed computer environment, program modules may be located in both local and remote memory storage devices.

The computer 30 illustrated in FIG. 2 comprises a conventional personal or desktop computer having a central processing unit (CPU) 32, memory 34 and a system bus 36, which couples various system components, including the memory 34 to the CPU 32. The system bus 36 may be any of several types of bus structures including a memory bus or a memory controller, a peripheral bus, and a local bus using any of a variety of bus architectures. The memory 34 includes read only memory (ROM) and random access memory (RAM). A basic input/output (BIOS) containing the basic routine that helps to transfer information between elements within the computer 30, such as during start-up, is stored in ROM. Storage devices 38, such as a hard disk, a floppy disk drive, an optical disk drive, etc., are coupled to the system bus 36 and are used for storage of programs and data. It should be appreciated by those skilled in the art that other types of computer readable media that are accessible by a computer, such as magnetic cassettes, flash memory cards, digital video disks, random access memories, read only memories, and the like, may also be used as storage devices. Commonly, programs are loaded into memory 34 from at least one of the storage devices 38 with or without accompanying data.

An input device 40 such as a keyboard, pointing device (mouse), or the like, allows the user to provide commands to the computer 30. A monitor 42 or other type of output device is further connected to the system bus 36 via a suitable interface and provides feedback to the user. The desired response 22 can be provided as an input to the computer 30 through a communications link, such as a modem, or through the removable media of the storage devices 38. The drive signals 17 are provided to the physical system 10 of FIG. 1 based on program modules executed by the computer 30 and through a suitable interface 44 coupling the computer 30 to the vibration system 13. The interface 44 also receives the actual response 21.

Before describing the present invention, it may also be helpful to review, in detail, a known method for modeling the physical system 10 and obtaining the drive 17 to be applied thereto. Although described below with respect to a test vehicle, it should be understood that this prior art method and the present invention discussed below are not confined to testing only vehicles, but can be used on other types of test specimens and substructures or components thereof. In addition, the description is done assuming spectral analysis based modeling estimation and implementation though operations can be carried by several other mathematical techniques (e.g. Adaptive Inverse Control (AIC) type models, parametric regression techniques such as Auto Regressive Exogenous (ARX) and State Space types of models, or combinations thereof).

Figure 3A:
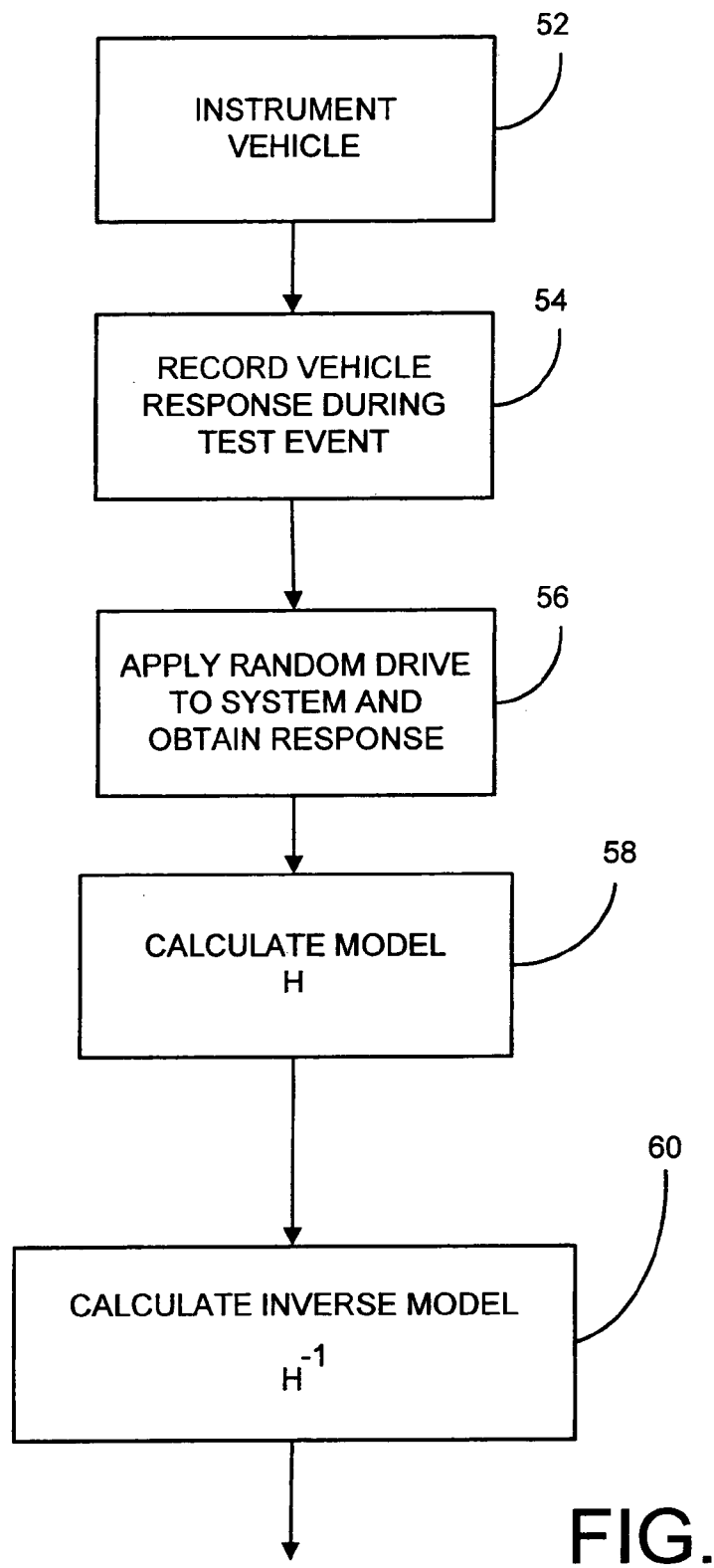
FIG. 3A is a flow chart illustrating the steps involved in an identification phase of a prior art method of vibration testing.

Referring to FIG. 3A, at step 52, the test vehicle is instrumented with the remote transducers 20. At step 54, the vehicle is subjected to the field operating environment of interest and the remote transducer responses are measured and recorded. For instance, the vehicle can be driven on a road or test track. The measured remote transducer responses, typically analog, are stored in the computer 30 in a digital format through analog-to-digital converters, as is commonly known.

Next, in an identification phase, the input/output model of the physical system 10 is determined. This procedure includes providing drive 17 as an input to the physical system 10 and measuring the remote transducer response 21 as an output at step 56. The drive 17 used for model estimation can be random "white noise" having frequency components over a selected bandwidth. At step 58, an estimate of the model of the physical system 10 is calculated based on the input drive applied and the remote transducer response obtained at step 56. In one embodiment, this is commonly known as the "frequency response function" (FRF). Mathematically, the FRF is a N×M matrix wherein each element is a frequency dependent complex variable (gain and phase versus frequency) The columns of the matrix correspond to the inputs, while the rows correspond to the outputs. As appreciated by those skilled in the art, the FRF may also be obtained directly from prior tests using the physical system 10 or other systems substantially similar to the physical system 10

An inverse model $H(f)^{-1}$ is needed to determine the physical drive 17 as a function of the remote responses at step 60. As appreciated by those skilled in the art, the inverse model can be calculated directly. Also, the term "inverse" model as used herein includes a M×N "pseudo-inverse" model for a non-square N×M system.

Figure 3B:
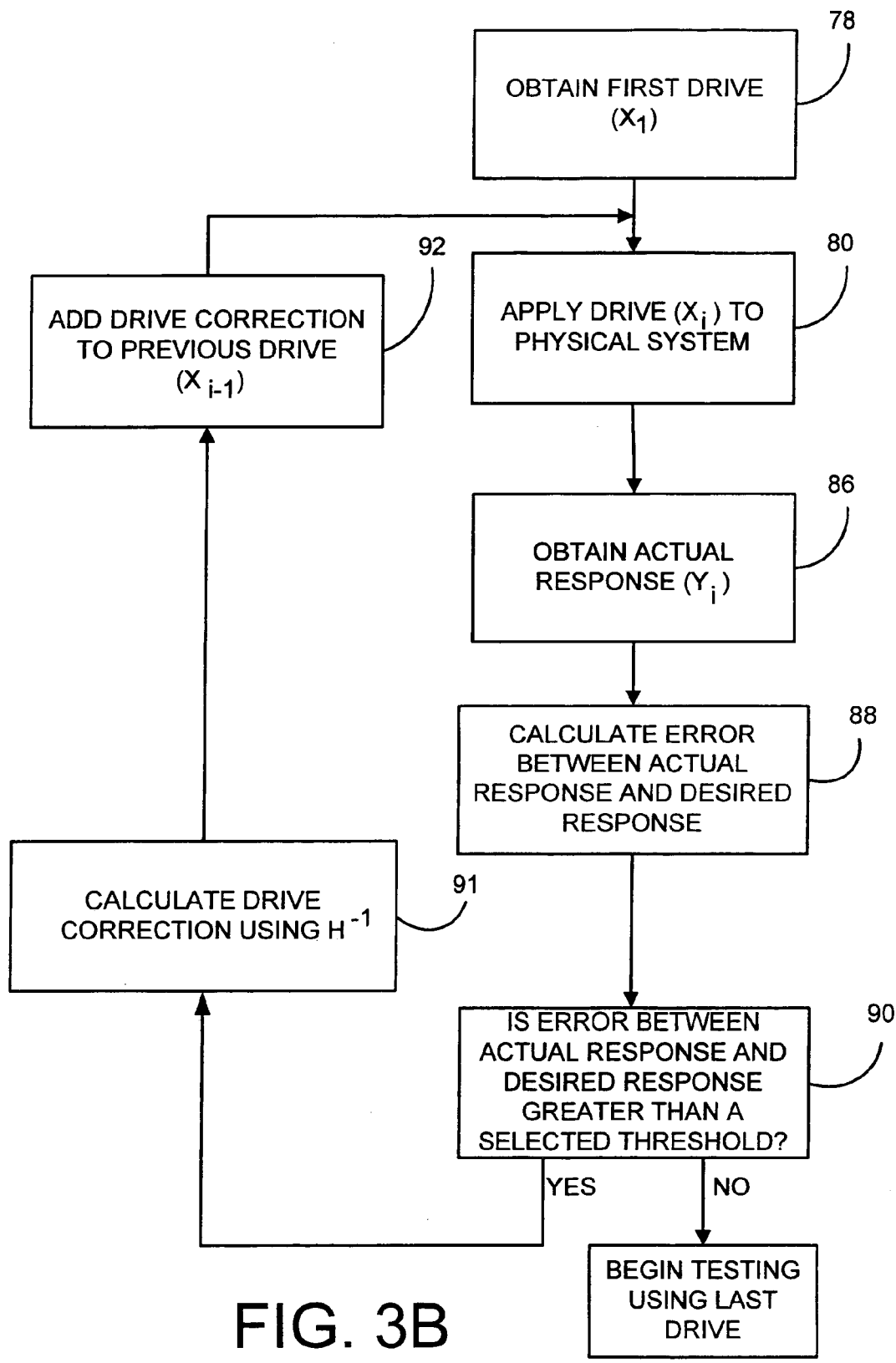
FIG. 3B is a flow chart illustrating the steps involved in an iterative phase of a prior art method of vibration testing.

At this point in the prior art, the method enters an iterative phase, illustrated in FIGS. 3B and, in part, FIG. 4A, to obtain drive 17 which produces actual response 21 that ideally replicates the desired remote transducer response 22 (hereinafter "desired response"). The inverse physical system model $H(f)^{-1}$ is represented at 72, while physical system (vibration system, test vehicle, remote transducers and instrumentation) is represented at 10. Referring to FIG. 3B, at step 78, the inverse model 72 is applied to a target response correction 77 in order to determine an initial drive 17 $x_1(t)$. The target response correction 77 can be the desired response 22 for the initial drive, though most often it is reduced by a relaxation gain factor 95. The calculated drive 17 $x_1(t)$ from the inverse model 72 is then applied to the physical system 10 at step 80. The actual remote transducer response 21 (hereinafter "actual response") $y_1(t)$ of the physical system 10 to the applied drive 17 $x_1(t)$ is then obtained at step 86. If the complete physical system 10 is linear (allowing a relaxation gain 95 of unity), then the initial drive 17 $x_1(t)$ could be used as the required drive. However, since physical systems are typically non-linear, the correct drive 17 has to be arrived at by an iterative process. (As appreciated by those skilled in the art, drive 17 used in previous tests for a similar physical system may be used as the initial drive.)

The iterative process involves recording the first actual response $y_1(t)$ resulting from the initial drive $x_1(t)$ and comparing it with the desired response 22 and calculating a response error 89 $\Delta y_1$ as the difference at step 88. (The first actual response signal $y_1(t)$ is provided at 87 in FIG. 4A.) The response error 89 $\Delta y_1$ is compared to a preselected threshold at step 90 and if the response error 89 exceeds the threshold an iteration is performed. Specifically the response error 89 $\Delta y_1$ is reduced by the relaxation gain factor 95 to provide the new target response correction 77. In this embodiment, the inverse transfer function $H(f)^{-1}$ is applied to the new target response correction 77 to create a drive correction $\Delta x_2$ 94 (step 91) that is added to the first drive $x_1(t)$ 17A to give a second drive $x_2(t)$ 17 at step 92. The iteration process (steps 80–92) is repeated until the response error 89 is brought down below the preselected threshold on all channels of the response. The last drive 17, which produced a response 21, that was within the predetermined threshold of the desired response 22, can then be used to perform specimen testing.

As described, the response error 89 $\Delta y$ is commonly reduced by the relaxation gain factor (or iteration gain) 95 to form the target response correction 77. The iteration gain 95 stabilizes the iterative process and trades off rate-of-convergence against iteration overshoot. Furthermore, the iteration gain 95 minimizes the possibility that the test vehicle will be overloaded during the iteration process due to non-linearities present in the physical system 10. As appreciated by those skilled in the art, an iteration gain can be applied to the drive correction 94 $\Delta x$ and/or the response error 89. It should be noted in FIG. 4A that storage devices 38 can be used to store the desired response 22, the actual responses 21 and previous drives 17A during the iterative process. Of course, memory 34 can also be used. Also, a dashed line 93 indicates that the inverse model 72 is an estimate of the inverse of the physical system 10. The block diagram of FIG. 4A, as discussed above, can be implemented by those skilled in the art using commercially available software modules such as included with RPCIII™ from MTS Systems Corporation of Eden Prairie, Minn.

Figure 3C:
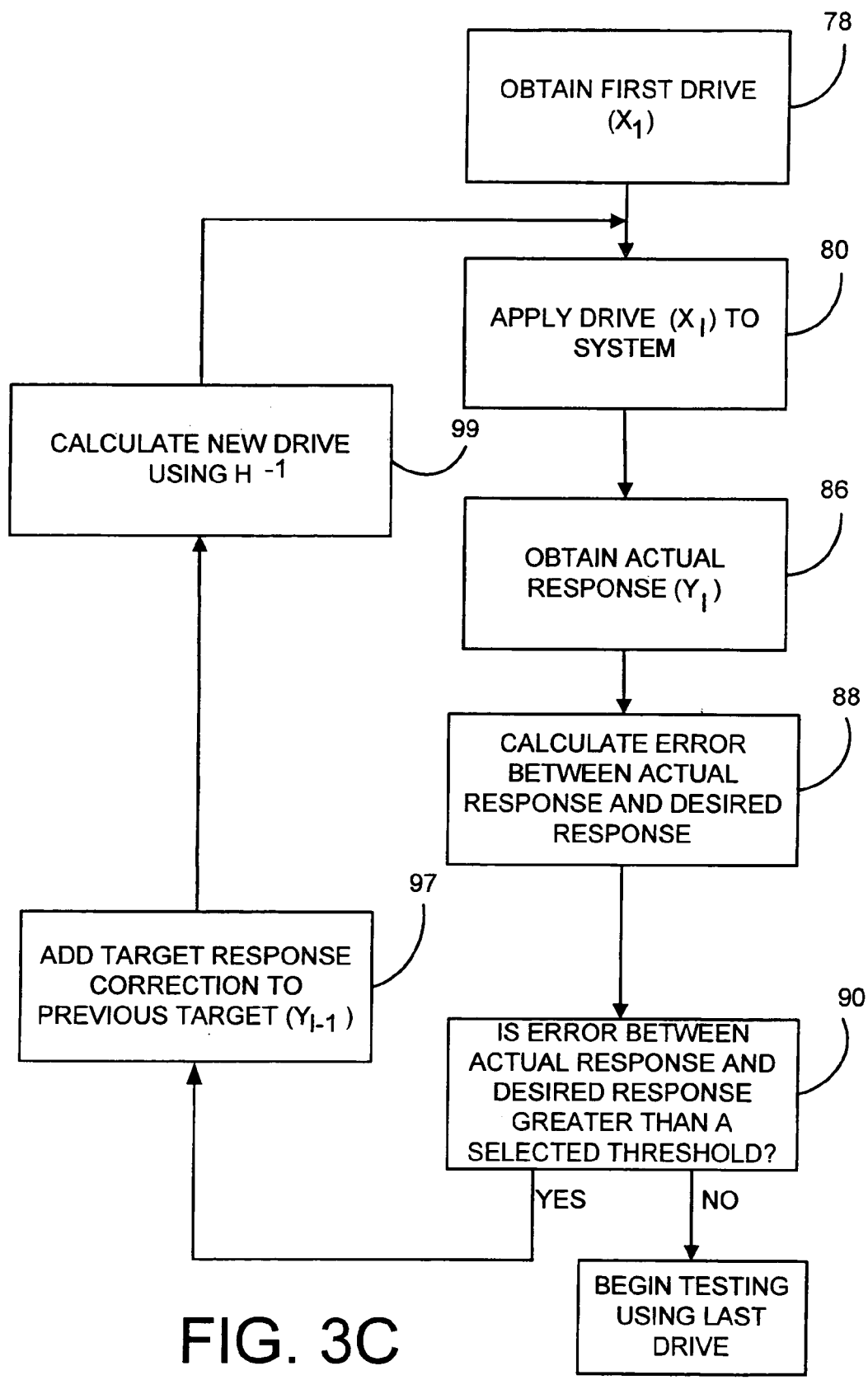
FIG. 3C is a flow chart illustrating the steps involved in another iterative phase of a prior art method of vibration testing.

At this point, a modified method of the prior art for calculating the drive can also be discussed. The modified prior art method includes the steps of the identification phase illustrated in FIG. 3A and many of the steps of the iterative phase illustrated in FIG. 3B. For convenience, the modified steps of the modified method are illustrated in FIG. 3C and, in part by the block diagram as illustrated in FIG. 4B. As illustrated in FIG. 4B, the calculation of the target response correction 77 is identical. However, if the response error 89 between the actual response 21 and the desired response 22 is greater than a selected threshold, then the target response correction 77 is added to a previous target response 79A at step 97 to obtain a new target response 79 for the current iteration. The inverse model 72 is applied to the target response 79 to obtain the new drive 17. As illustrated in FIG. 4B, the iteration gain 95 can be used for the reasons discussed above.

Figure 4A:
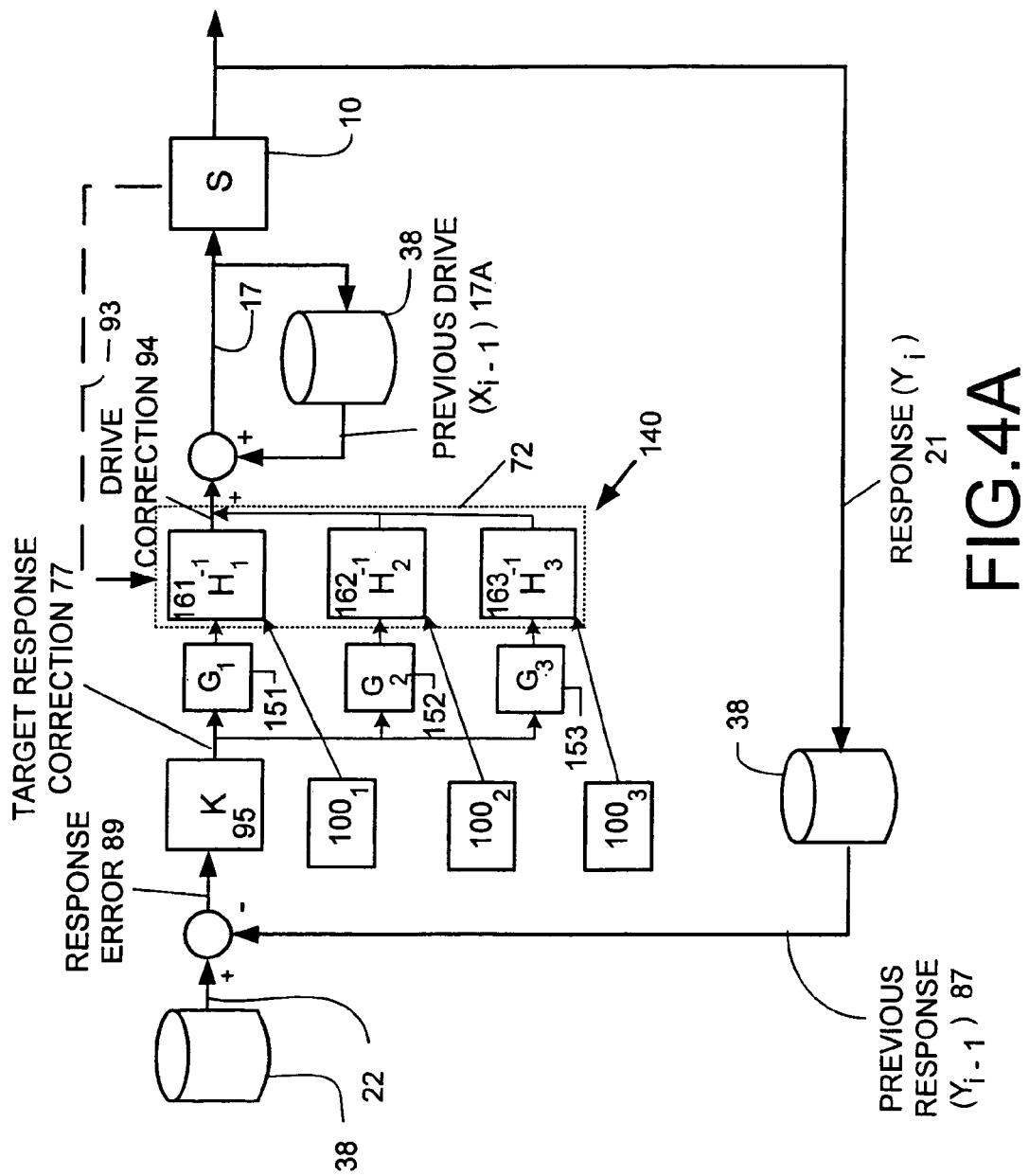
FIG. 4A is a detailed block diagram of an iterative process for obtaining drive signals for a vibration system with a multiple region convolver of the present invention.
Figure 4B:
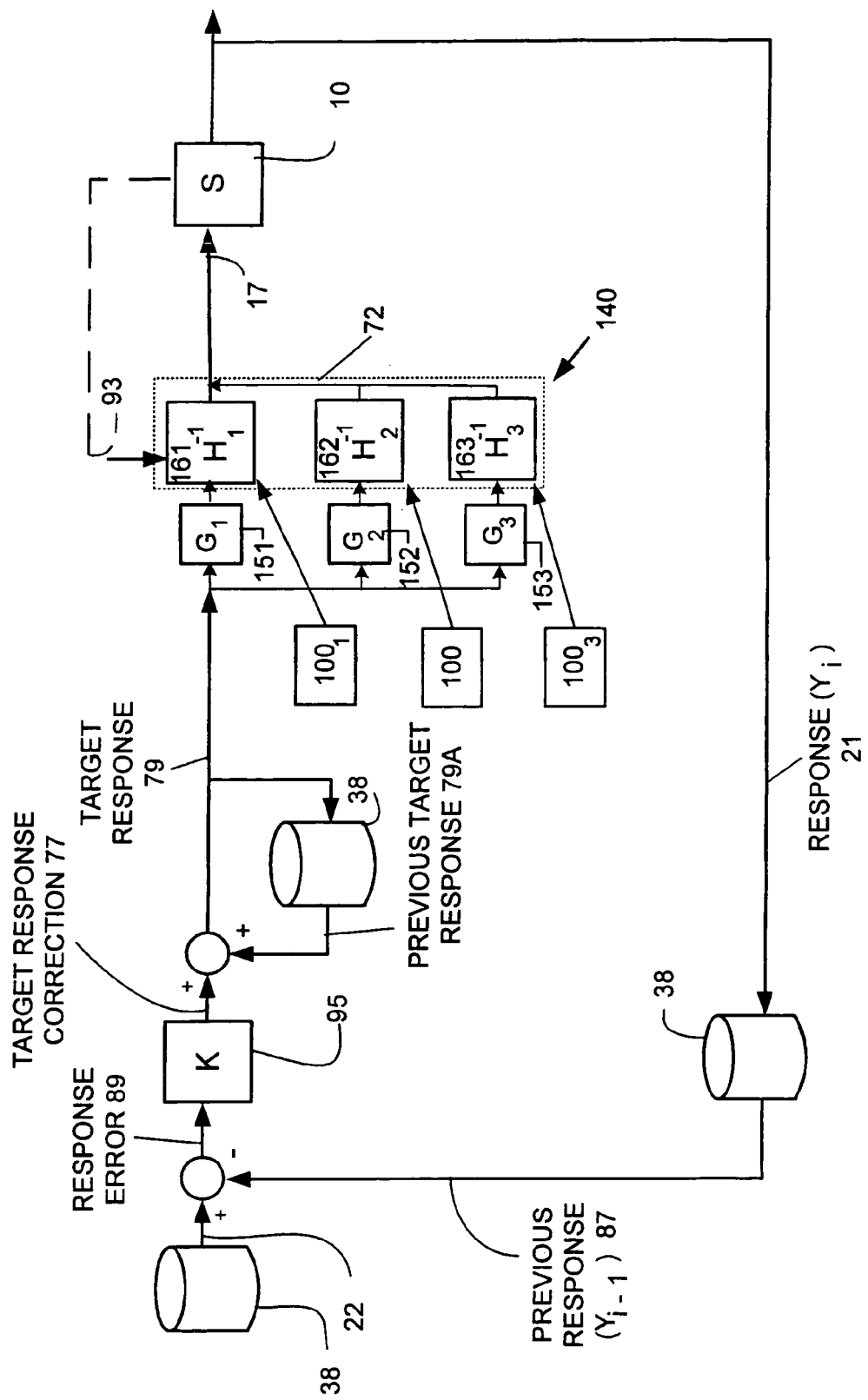
FIG. 4B is a detailed block diagram of another iterative process for obtaining drive signals for a vibration system with the multiple region convolver of the present invention.
Figure 5:
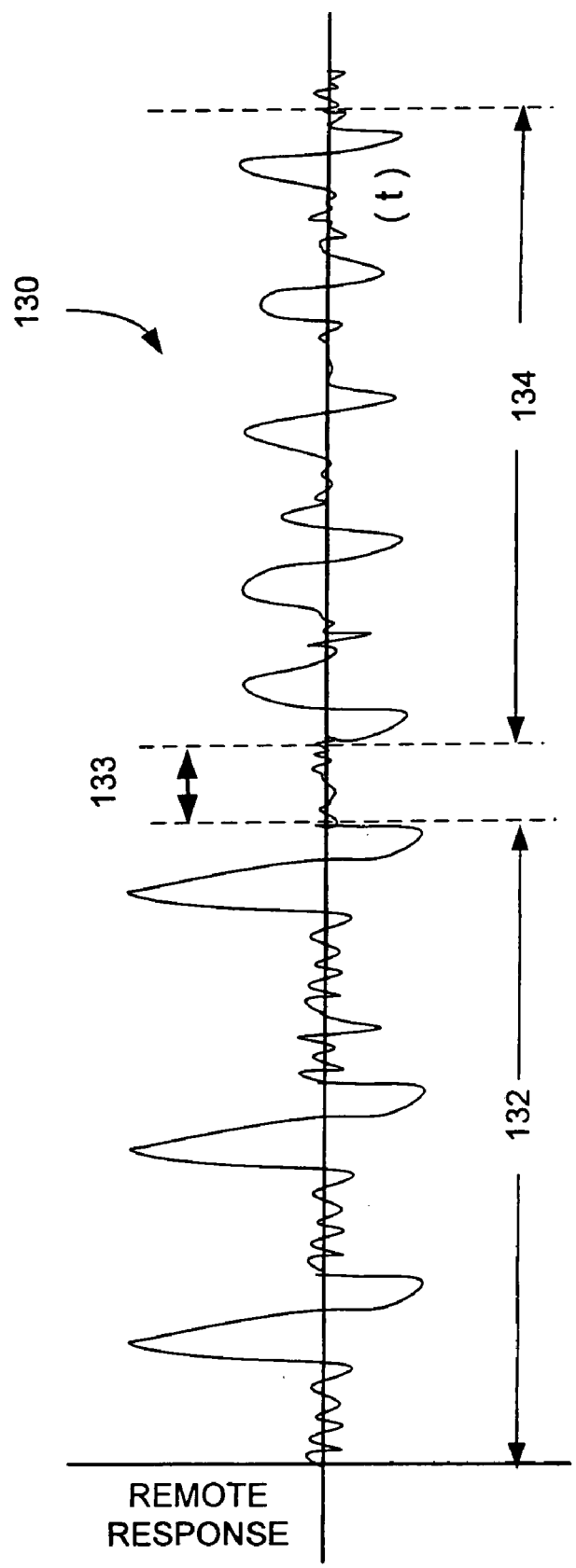
FIG. 5 is a pictorial representation of a multiple region record.

FIG. 5 is a pictorial representation 130 of an example time history record of remote transducer response data from a statistically non-stationary road surface; wherein a first section 132 is indicative of sequence of potholes, a second section 134 is indicative of cobblestones, and third sections 133 are indicative of smooth pavement. As illustrated, the smooth pavement is located between the potholes and the cobblestones as well as after the cobblestones such regions however need not be contiguous. For example, the cobblestone regions could have non-contiguous portions. Generally, as illustrated in FIGS. 4A and 4B, an aspect of the present invention is a multiple region convolver 140 with inter-region tapering. The multiple region convolver 140 allows multiple models or inverse models to be used wherein a model or inverse model is used with specific regions of the time history (e.g. two or more models or inverse models for regions 132–134). Inter-region tapering provides smooth transitions between the models or inverse models, thereby minimizing potential damage to the vibration system or test specimen.

Figure 6:
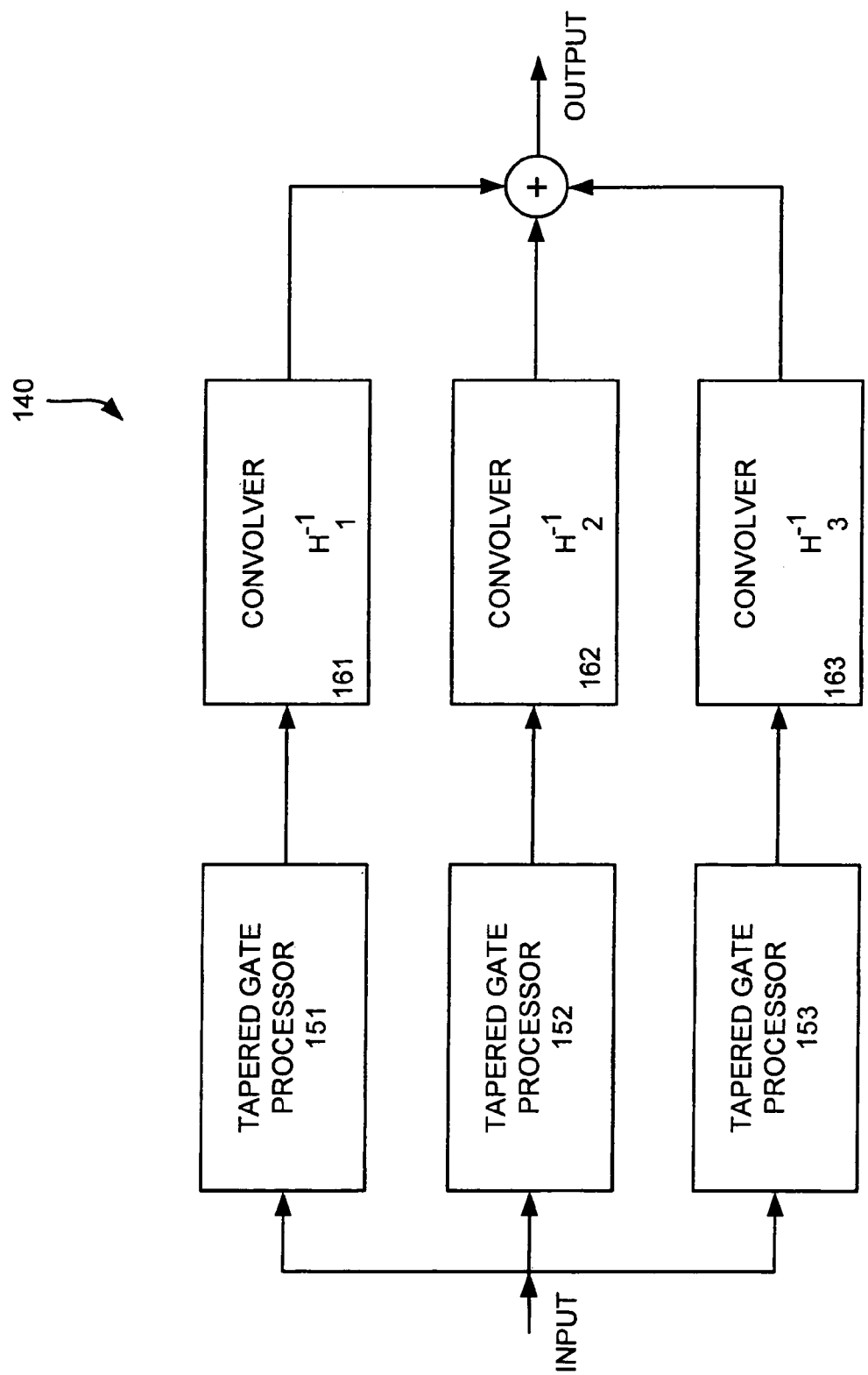
FIG. 6 is a general block diagram of the multiple region convolver.

FIG. 6 illustrates the multiple region convolver 140 with inter-region tapering. General, use of multiple-region convolving is known in the art. With respect to the time history record 130 of FIG. 5, inverse models can be created for each of the unique regions of record 130. For example, a first inverse model $H^{-1}_1$ would be used for region 132, a second inverse model $H^{-1}_2$ would be used for region 134 and inverse model $H^{-1}_3$ would be used for region 133. Each inverse model includes a tapered gate module, $G_1$ (151) $G_2$ (152) and $G_3$ (153) (i.e. one tapered gate module, $G_k$, for each corresponding unique region, $R_k$, having a corresponding model $H_k$ or inverse model $H^{-1}_k$ (161–163)). Collectively, $G_1$, $G_2$ and $G_3$, and $H^{-1}_1$, $H^{-1}_2$ and $H^{-1}_3$ comprise the multiple region convolver 140 with an inter-region tapering assembly. It should be noted that although illustrated in FIG. 5 wherein three regions are depicted with three corresponding gate modules and three inverse models, the techniques described herein can be expanded to "N" regions wherein one-to-one correspondence of gate modules and models need not be provided.

In FIG. 4A, the input signal to the multiple region convolver 140 comprises the target response correction 77, and as illustrated, is applied to each of the tapered gate modules $G_1$, $G_2$ and $G_3$. Each tapered gate module 151–153 multiplies the input signal by a tapering function, which smoothly tapers from a value of 0.0 outside of each region $R_k$ to a value of 1.0 in the interior of region $R_k$. In other words, each tapered gate module 151–153 filters the input signals so as to apply it correctly to each of the inverse models $H^{-1}_1$ (161), $H^{-1}_2$ (162) and $H^{-1}_3$ (163) which are being used for each respective region. The tapering function can take any form that changes value with time, preferably, smoothly, and as such can be linear or non-linear, if desired. Specific tapering functions can include haversines, ramps, polynomials, etc. In one embodiment, the tapering function can take the form of a cycloidal function defined by:

$$\alpha - \sin(2\pi\alpha)/2\pi \qquad \text{EQ. 1}$$

for tapering up (0.0–1.0), or $$(1-\alpha)-\sin(2\pi(1-\alpha))/2\pi \qquad \text{EQ. 2}$$

for tapering down (1.0–0.0).

Figure 7:
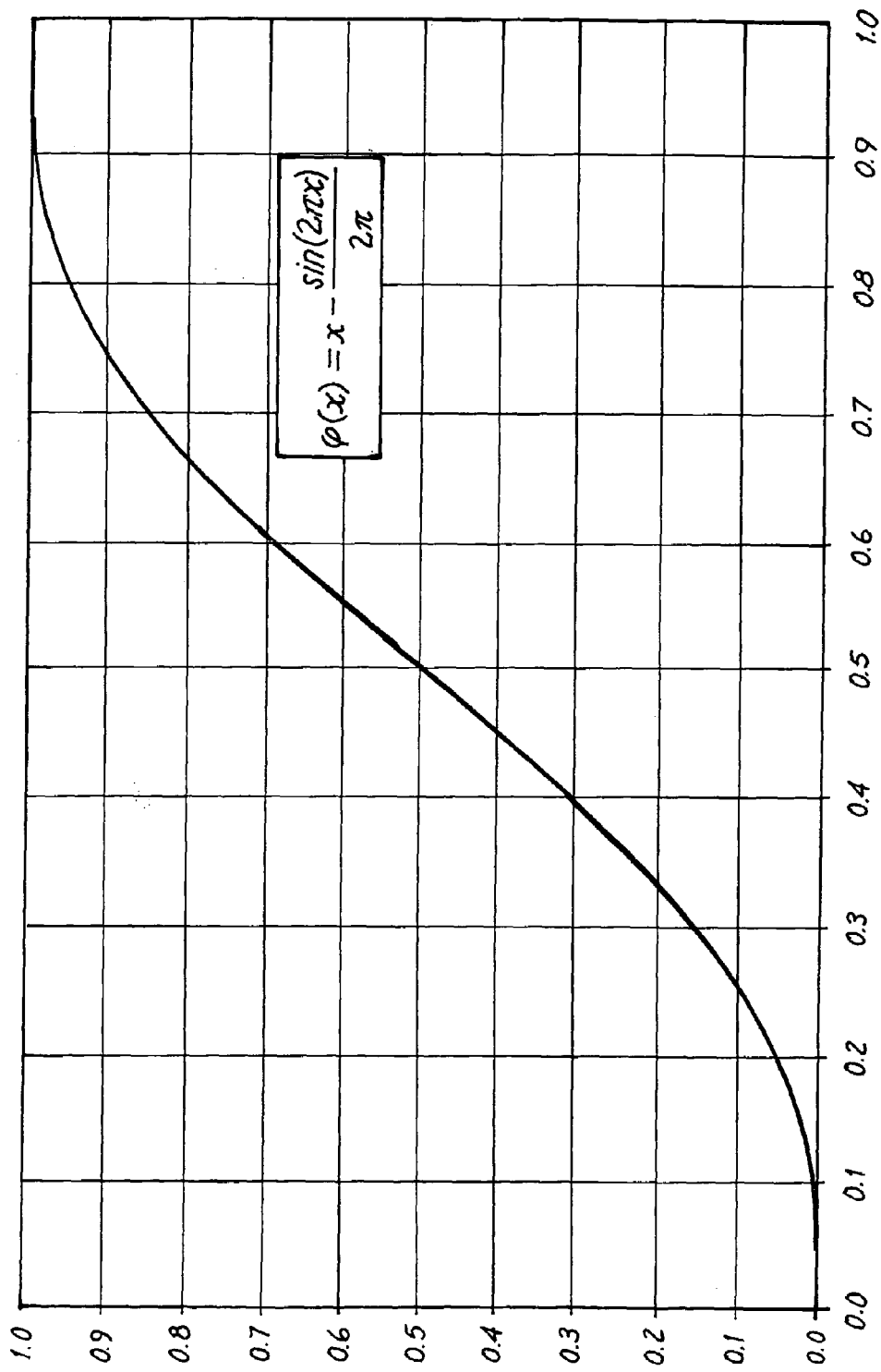
FIG. 7 is a pictorial representation of an exemplary tapering function.

FIG. 7 illustrates the form of the tapering function defined by equation EQ. 1. The tapering function for EQ. 2 would be similar (a mirror image). In the foregoing equations, the quantity α represents a time variable centered at the region or interval endpoint, $t_k$, plus or minus a number δ, the tapering interval, which is parameter, according to the following equation:

$$\alpha = \frac{t - t_k}{\delta} + \frac{1}{2} \qquad \text{EQ. 3}$$

Figure 8:
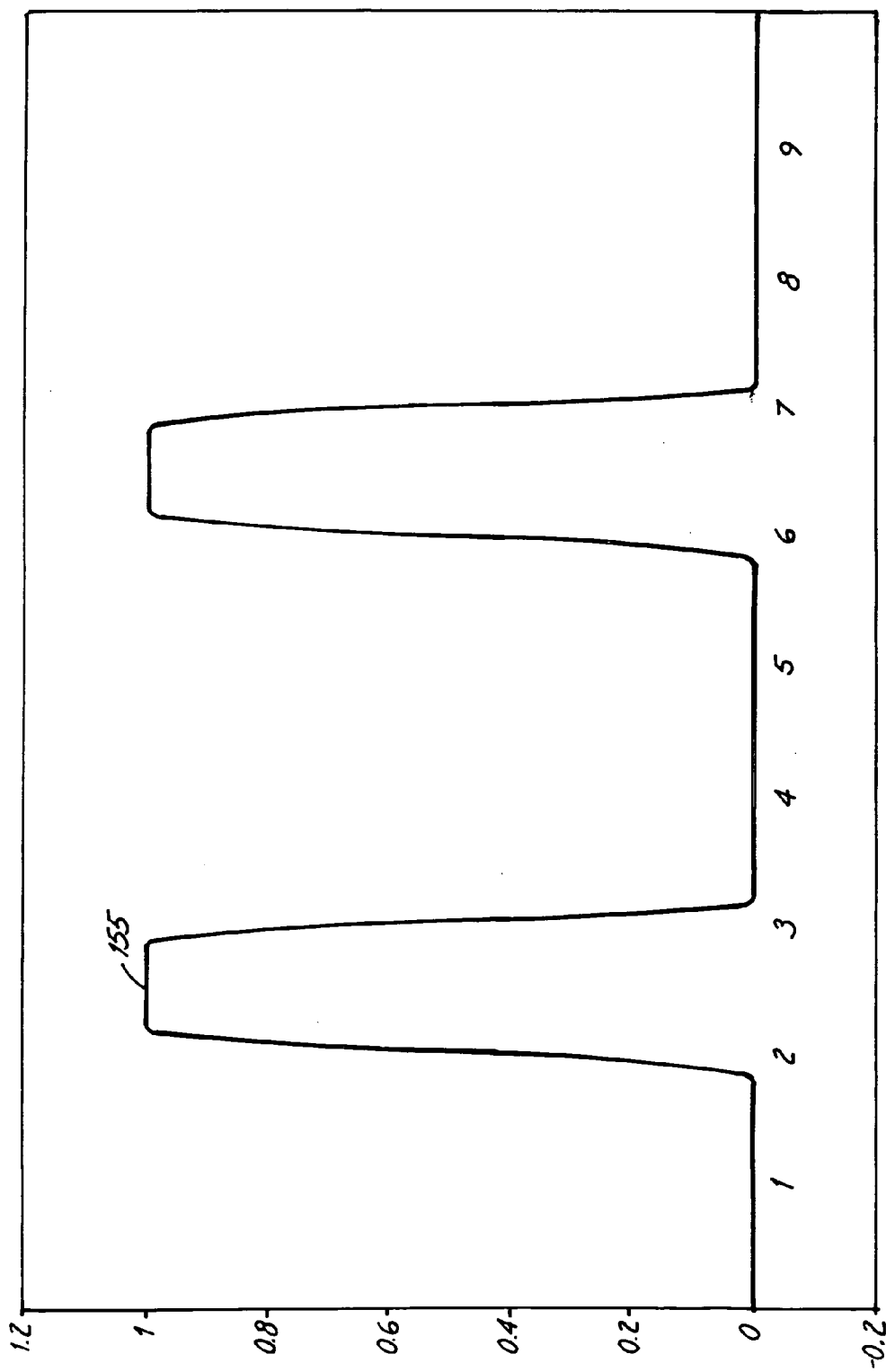
FIG. 8 is a pictorial representation of an exemplary tapered gate function.
Figure 9:
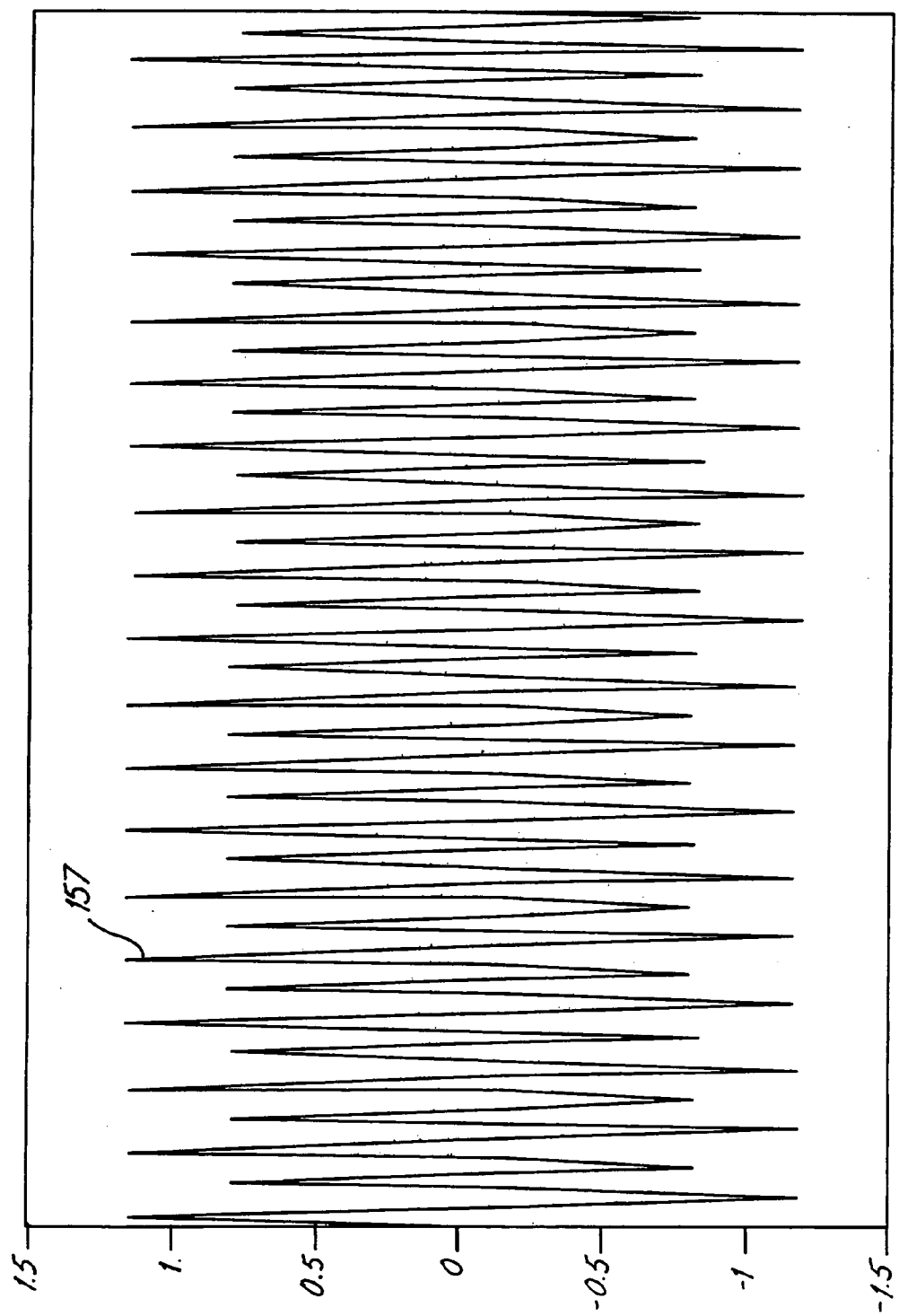
FIG. 9 is a pictorial representation of an exemplary input signal.
Figure 10:
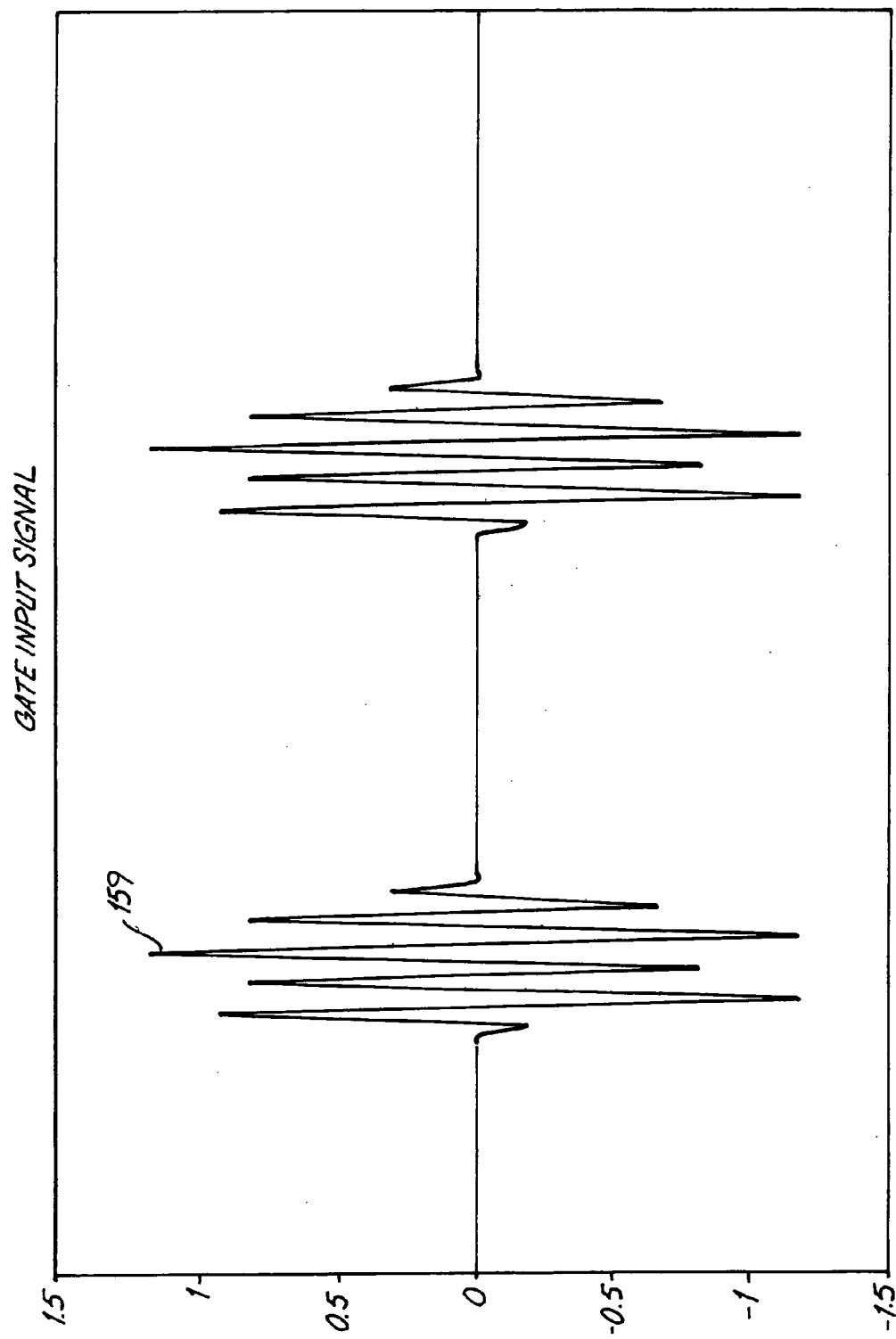
FIG. 10 is a pictorial representation of an output signal obtained from application of the input signal to the tapered gate function.

For instance, FIG. 8 illustrates a tapered gate function 155 for regions consisting of times 2.0–3.0 and 6.0–7.0 seconds. FIG. 9 illustrates a hypothetical input signal 157 to a tapered gate module for these regions, and FIG. 10 illustrates a result 159 of passing the input signal through the tapered gate module having the profile of FIG. 9.

It should be noted that in one embodiment, the tapering up function is a compliment to the tapering down function such that at any given instant during the transition period, the sum of the values of the tapering up function and the tapering down function equal 1.0, although in other embodiments the sum of the values of the tapering up function and the tapering down function may vary during a transition period. In addition, the sum can be greater or less than 1.0, although the values greater than 1.0 are generally not preferred since this condition may exacerbate problems associated with transitioning from one model to the next model.

As illustrated in FIG. 4A, each tapered gate module 151–153, $G_k$, is connected to a corresponding inverse module 161–163, $H^{-1}{}_k$, that convolves the output of the tapered gate module with the inverse model $H^{-1}{}_k$. The outputs from all the inverse models $H^{-1}{}_1$, $H^{-1}{}_2$ and $H^{-1}{}_3$ are summed to obtain a combined signal, herein the drive correction 94.

It should also be noted that although the input signal could be applied to each of the gate modules 151–153 simultaneously wherein the gate modules have tapering functions with a value of zero outside the range of intended use, the input signal can be applied to the gate modules 151–153 and thus the inverse modules 161–163 such that the output signals, when combined, is of the form as if the input signal was applied simultaneously as discussed above. For instance, the input signal, or only relevant parts thereof, can be processed separately or sequentially with the outputs thereof stored and later combined appropriately to realize the same output signal as if the input signal was applied simultaneously.

FIG. 4A illustrates use of the multiple region convolver assembly 140 in a well-known implementation. It should be understood that this is but one exemplary embodiment in that the multiple region convolver assembly 140 can also be used with variations of this system such as described below in the following embodiments. Generally, the multiple region convolver assembly 140 can be applied to forward models (H) of the physical system or to inverse models ($H^{-1}$) of the physical system. As discussed above, multiple forward or inverse models are used for different regions of the desired record, while the tapering gate modules ensure that the appropriate forward or inverse model is being used at any given instant in the records (although two forward or inverse models may be being used in any transition period) and that a smooth transition is obtained from one model to the next model. In many of the embodiments described below, forward or inverse model correction values are obtained during iteration, are stored, and are used to improve the forward or inverse models. In particular, the multiple region convolver assembly 140 can replace each of the static components 98A or 172A described below. Alternatively, the multiple region convolver assembly 99 can replace each of the models 172 or inverse models 98 collectively.

In a further embodiment as illustrated in FIGS. 4A and 4B, the system includes an adjuster 100 that operates during each step of the iterative process, to improve the physical system inverse model 72. As illustrated in FIG. 4A, the adjuster 100 corrects the inverse model 72 which receives the target response correction 77 directly as a simple function of the response error 89 (i.e. without previous target information 79A of FIG. 4B) and where the physical system drive 17 comprises drive correction 94 in combination with a previous drive 17A. Conversely, as illustrated in FIG. 4B, the inverse model 72 receives the target response 79 as the combination of the target response correction 77 and the previous target response 79A, and drive 17 is directly obtained by applying the inverse model 72. In the case of FIG. 4B, the adjuster 100 corrects the inverse model 72 in a conceptually identical fashion as in FIG. 4A. However, the configurations of FIGS. 4A and 4B render different signals available to the virtual identity modeling process each with inherent situational advantages. Furthermore, the adjuster 100 can also operate in an iterative manner.

In the illustrations of FIGS. 4A and 4B, an adjuster 100 is provided for each of the inverse models 161–163. In another embodiment, the same adjuster can be used for each of the inverse models 161–163, wherein FIGS. 4A and 4B then convey that the adjuster is applied to each of the inverse models 161–163.

Figure 11:
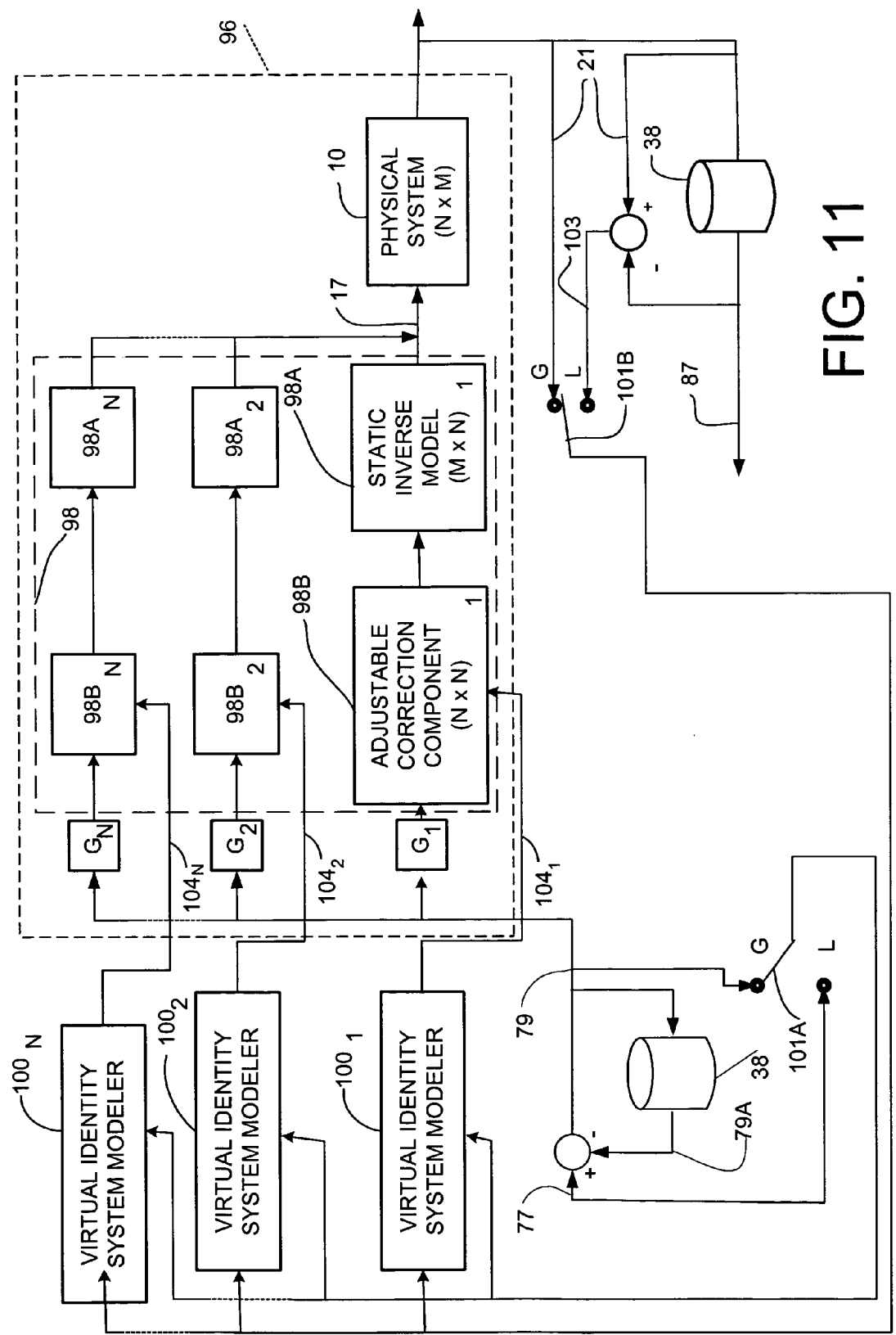
FIG. 11 is a general block diagram of the multiple region convolver with an adjuster.

FIG. 11 illustrates a method of controlling the physical system 10 to produce an actual response 21 that ideally matches the desired response 22. The method includes generating an inverse model 98 (e.g. the inverse transfer function $H(f)^{-1}$) for separate regions of the physical system 10, wherein the inverse model 98 is applied to the target response 79 to obtain the drive 17 intended to generate the desired response 22 from the physical system 10 as the actual response 21 for each region of the record. Similar to FIG. 4B, the target response correction 77 can be combined with the previous target response 79A, when the inverse model 98 is applied to the target response 79 to realize the complete drive 17. Alternatively the inverse model 98 can be applied to the target response correction 77 directly to realize the drive correction 94, which is then subsequently combined with the previous drive 17A to provide a new drive 17 for the physical system 10 in a manner similar to FIG. 4A.

Referring back to FIG. 11, the adjuster 100 can comprise a virtual identity system modeler that checks a quality of identity of the inverse model 98 in combination with the physical system 10. The combination of the inverse model 98 and the physical system 10 is designated as a virtual identity system 96. The quality of identity, as measured by the virtual identity system modeler 100, assesses the accuracy of the physical system 10 model relative to the operating characteristics of the physical system 10. In this embodiment, the quality of identity is measured via the series connection of the physical system 10 with the inverse system model 98. When the inverse system model 98 identically matches the physical system 10, the quality of identity calculation produces an identity result, indicating an ideal inverse system model estimate.

The advantage of this approach is that a model of a potential correction to the physical system inverse model that improves the quality of the virtual identity system can take a simpler form than the inverse model itself. Consequently, the model correction is much easier to obtain than a new estimate of the complete inverse system model. This approach leads to a straightforward algorithmic formulation of such a correction model estimate (e.g. the FRF between the target response and the actual response). The simple form of this modeling technique allows smaller segments of noisier and more correlated data to be used, thereby providing an advantage in an adaptive environment for either non-parametric (spectrum analysis, etc.) or parametric (ARX, etc.) modeling methods.

In one embodiment of FIG. 11, with switches 101A and 101B at position "G", the virtual identity system modeler 100 compares the target response 79 and the actual response 21. In another embodiment with switches 101A and 101B at position "L", the virtual identity system modeler 100 compares the target response correction 77 and an actual response correction 103 (difference between response $y_i$ and response $y_{i-1}$) obtained from application of the drives 17 to the physical system 10 for successive iterations. In either embodiment, the virtual identity system modeler 100 subsequently adapts the inverse model 98 as a function of the quality of identity from iteration to iteration. In other words, the virtual identity system modeler 100 provides as an output, model (e.g. FRF) correction values 104 to adjust at least some of the values present in the inverse model 98 for each region of the record. In both of these embodiments, the correction values 104 are derived on a channel by channel basis, a natural simplification facilitated by the virtual identity system. Cross-coupling effects do not then form part of the correction values 104, although all terms of the inverse model 98 will generally change when the correction values 104 are applied. These embodiments however do not preclude the option of including some or all cross-coupling terms into the correction values 104.

It should be understood that switches 101A and 101B represent selection of the type of data provided to the virtual identity system modeler 100 and are not typically a physical electrical switch. Rather, switches 101A and 101B represent software routines or modules used to acquire and provide the selected data to the virtual identity system modeler 100.

In FIG. 11, the inverse model 98 includes a static inverse model component 98A and an adjustable component 98B. The static component 98A is similar to the inverse model 72, discussed above. For instance, the static component 98A can be the inverse model $H(f)^{-1}$ that was calculated by taking the inverse of forward model H(f) at step 58 (FIG. 3A). The static component 98A of the inverse model typically comprises a M×N matrix that includes cross-coupling effects, where M is the number of inputs (drive 17) and N is the number of outputs (actual response 21).

The adjustable component 98B receives the inverse model correction values 104 from the virtual identity system modeler 100 for purposes of iteratively adapting the inverse model 98 to the current operating conditions for each region of the record. In one embodiment, the adjustable component 98B comprises an N×N matrix with correction values for each of the N channels located on the diagonal and all other values (off-diagonal) equal to zero.

Figure 12:
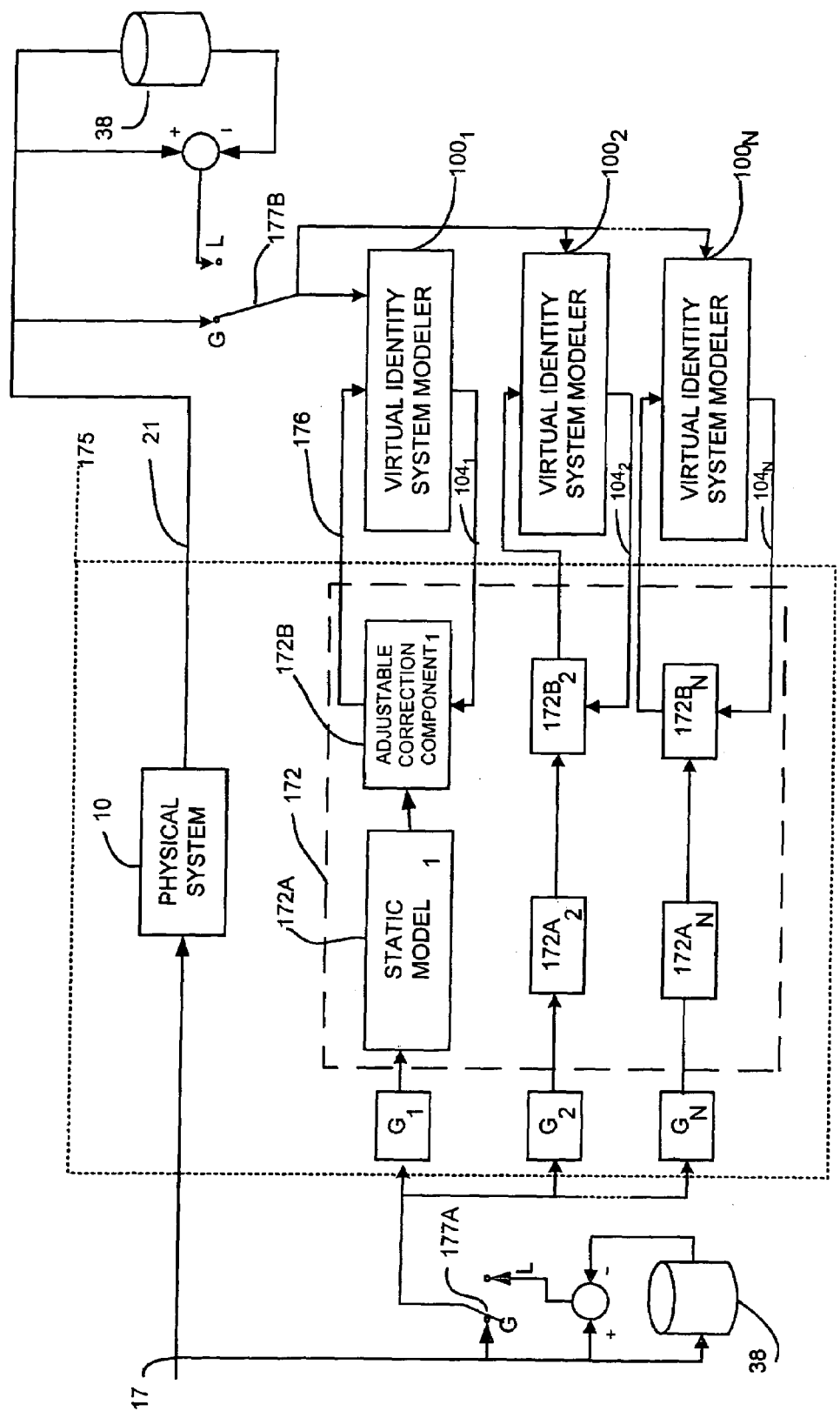
FIG. 12 is another general block diagram of the multiple region convolver with the adjuster.

Another embodiment is illustrated in FIG. 12. For cases where the target response 79 (or target response correction 77) does not exist in the forward iteration control loop, it can be explicitly computed with mathematical equivalence as demonstrated in FIG. 12. In FIG. 12, drive 17 is applied to the physical system 10 and to a forward model 172 of the physical system 10, wherein a virtual identity system is indicated by dashed lines 175. It can be shown that virtual identity system 175 is mathematically equivalent to the virtual identity system 96 of FIG. 11.

The actual response 21 from the physical system 10 and a modeled target response 176 from the forward model 172 are provided to the virtual identity system modeler 100. In one embodiment, the virtual identity system modeler 100 performs spectrum analysis between the actual response 21 and the modeled target response 176 to check the quality of identity of virtual identity system 175, since signal 176 is equal to either signal 79 or signal 77 of FIG. 11, depending on the position of switch 177A. The virtual identity system modeler 100 subsequently adjusts the model 172 accordingly as a function of the quality of identity for each region of the record.

In the embodiment illustrated, the model 172 includes a static component 172A and an adjustable component 172B for each region of the record. The static component 172A can be obtained per step 58 of FIG. 3A. The static component 172A typically comprises a N×M model that includes cross-coupling terms.

The virtual identity system modeler 100 provides correction values 104 to each adjustable component 172B. In one embodiment, the adjustable components 172B comprise N×N diagonal models.

In a manner similar to FIG. 11, switches 177A and 177B allow the inputs to the virtual identity system modeler 100 to be either the modeled target response and the actual response or the modeled target response corrections and the actual response corrections. Those skilled in the art will recognize that switch 177A and associated summer and storage device could also be applied in the data path between the static model 172A and the adjustable component 172B rather than operating on the drive 17 as illustrated. Likewise, the switch 177A and associated summer and storage device can also be applied to the modeled target response 176 in some circumstances.

A complete discussion of the virtual identity system modeler 100 and other embodiments that can benefit from the present invention is described in International application PCT/US99/01233 filed Jan. 21, 1999, which is incorporated herein in its entirety.

Although the present invention has been described with reference to preferred embodiments, workers skilled in the art will recognize that changes may be made in form and detail without departing from the spirit and scope of the invention.

What is claimed is:

1. A computer-implemented method for controlling a physical system using a form of a model of the physical system, the method comprising:
    applying an input signal to a first model of the physical system stored in a computer and a second model of the physical system stored in the computer during a transition period from operating under the first model to operating under the second model, wherein the input signal is tapered during the transition period when applied to the first model and the second model; and
    controlling the physical system using the computer to combine an output signal from the first model with an output signal from the second model during the transition period.

2. The method of claim 1 wherein a tapering function associated with the first model decreases a magnitude of the input signal with time during the transition period and a tapering function associated with the second model increases a magnitude of the input signal with time during the transition period.

3. The method of claim 2 wherein the tapering function associated with the first model is a compliment of the tapering function associated with the second model.

4. The method of claim 3 wherein a gain of the tapering function associated with the first model varies from 1.0 to 0.0 during the transition period and a gain of the tapering function associated with the second model varies from 0.0 to 1.0 during the transition period.

5. The method of claim 4 wherein at any instance during the transition period a sum of the gain of the tapering function associated with the first model and the gain of the tapering function associated with the second model is less than or equal to one.

6. The method of claim 4 wherein at any instance during the transition period a sum of the gain of the tapering function associated with the first model and the gain of the tapering function associated with the second model is equal to one.

7. The method of claim 4 wherein each of the tapering functions comprises a cyclodial function.

8. The method of claim 1 wherein the model comprises an inverse model of the physical system.

9. The method of claim 1 wherein the model comprises a forward model of the physical system.

10. A computer readable medium including instructions readable by a computer, which when implemented, cause the computer to control a physical system, the instructions comprising:
applying an input to a first model and a second model of the physical system during a transition period from operating under the first model to operating under the second model, wherein the input is tapered during the transition period when applied to the first model and the second model; and
combining an output from the first model with an output from the second model during the transition period to control the physical system.

11. The computer readable medium of claim 10 wherein a tapering function associated with the first model decreases a magnitude of the input with time during the transition period and a tapering function associated with the second model increases a magnitude of the input with time during the transition period.

12. The computer readable medium of claim 11 wherein the tapering function associated with the first model is a compliment of the tapering function associated with the second model.

13. The computer readable medium of claim 12 wherein a gain of the tapering function associated with the first model varies from 1.0 to 0.0 during the transition period and a gain of the tapering function associated with the second model varies from 0.0 to 1.0 during the transition period.

14. The computer readable medium of claim 13 wherein at any instance during the transition period a sum of the gain of the tapering function associated with the first model and the gain of the tapering function associated with the second model is less than or equal to one.

15. The computer readable medium of claim 13 wherein at any instance during the transition period a sum of the gain of the tapering function associated with the first model and the gain of the tapering function associated with the second model is equal to one.

16. The computer readable medium of claim 13 wherein each of the tapering functions comprises a cyclodial function.

17. The computer readable medium of claim 10 wherein the model comprises an inverse model of the physical system.

18. The computer readable medium of claim 10 wherein the model comprises a forward model of the physical system.

19. A system controller for controlling a physical system, the system controller comprising:
means for applying an input to a first model and a second model of the physical system during a transition period from operating under the first model to operating under the second model, wherein the input is tapered during the transition period when applied to the first model and the second model; and
means for combining an output from the first model with an output from the second model during the transition period to control the physical system.

20. The system controller of claim 19 wherein the means for applying includes: a tapering function associated with the first model to decrease a magnitude of the input with time during the transition period; and a tapering function associated with the second model to increase a magnitude of the input with time during the transition period.

21. The system controller of claim 20 wherein the tapering function associated with the first model is a compliment of the tapering function associated with the second model.

22. The system controller of claim 21 wherein a gain of the tapering function associated with the first model varies from 1.0 to 0.0 during the transition period and a gain of the tapering function associated with the second model varies from 0.0 to 1.0 during the transition period.

23. The system controller of claim 22 wherein at any instance during the transition period a sum of the gain of the tapering function associated with the first model and the gain of the tapering function associated with the second model is less than or equal to one.

24. The system controller of claim 22 wherein at any instance during the transition period a sum of the gain of the tapering function associated with the first model and the gain of the tapering function associated with the second model is equal to one.

25. The system controller of claim 22 wherein each of the tapering functions comprises a cyclodial function.

26. The system controller of claim 19 wherein the model comprises an inverse model of the physical system.

27. The system controller of claim 19 wherein the model comprises a forward model of the physical system.

* * * * *